Sept. 27, 1966  A. R. B. PAVEY ET AL  3,274,703
TEACHING MACHINES

Filed Oct. 30, 1964  2 Sheets-Sheet 1

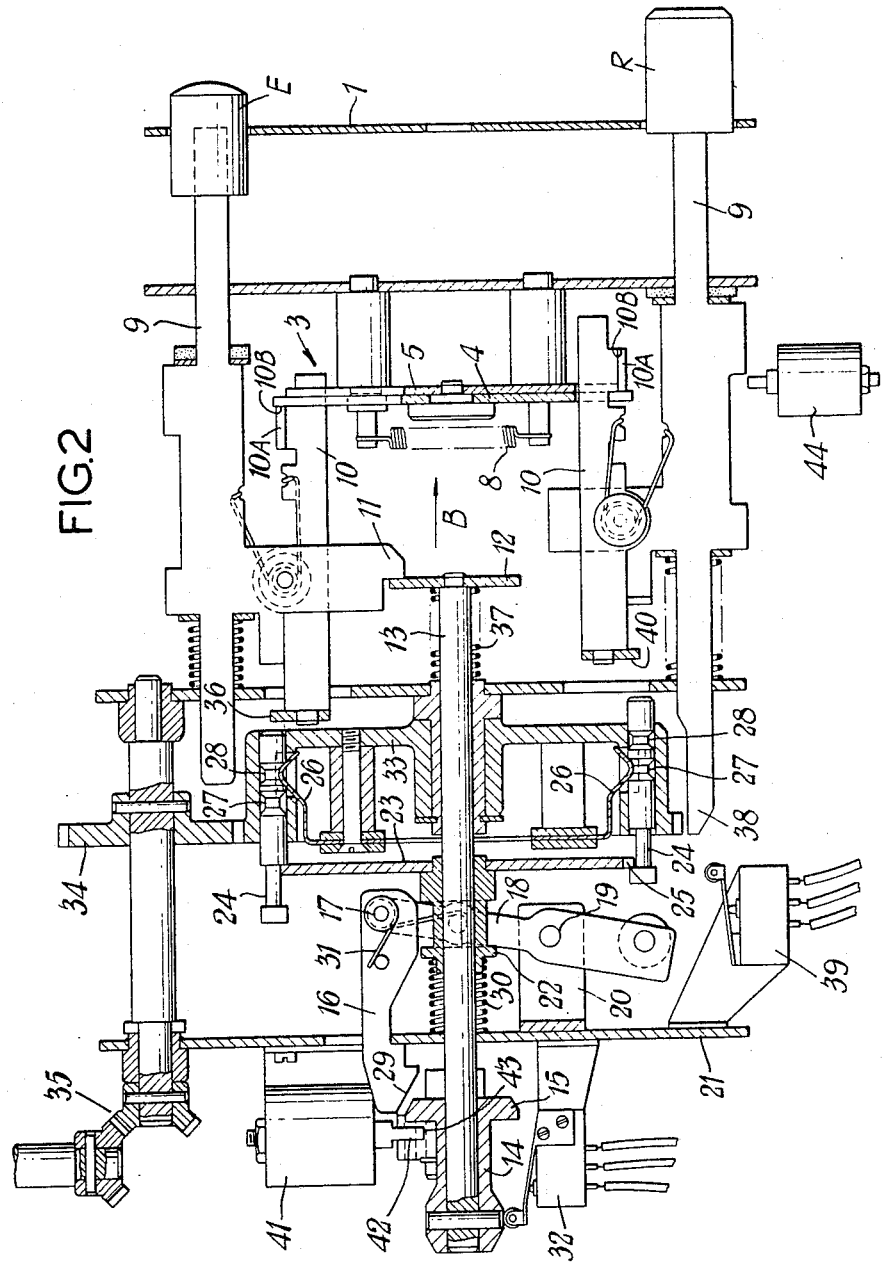

3,274,703
TEACHING MACHINES
Arthur Robert Brian Pavey and Alexander Puchnarewicz, Welwyn Garden City, and James Katavolos, Richmond, England, assignors to U.S. Industries Inc. Engineering Limited, Burtonwood, Warrington, England, a British company
Filed Oct. 30, 1964, Ser. No. 407,767
Claims priority, application Great Britain, Nov. 1, 1963, 43,169/63
5 Claims. (Cl. 35—9)

The present invention relates to selector mechanisms and in particular to mechanical selector mechanism suitable for controlling the duration or extent of movement of a movable member in dependence upon which one of a number of selectively operable selection members is operated to initiate such movement.

The invention has particular application to teaching machines of the type in which text recorded on successive frames of a photographic film is selectively displayed on a viewing screen in the course of operation of the machine.

In such teaching machines it is customary to have recorded on one frame a text to be studied, a question on such text and a number of answers to such question, and on subsequent frames to have comments on each wrong answer it is possible to select and/or "branch" expansions of the original text designed to assist a pupil in arriving at the correct answer. In the operation of such a machine the film transport mechanism is required to move forwardly over different numbers of steps according to which answer is selected and to return to the original frame each time an incorrect answer is selected. It is thus necessary for the selector mechanism controlling such movements to embody some means of storing an indication of the location of the original frame.

It is an object of the present invention to provide an improved form of such selector mechanism.

The various features and advantages of the invention will be apparent from the following description of an exemplary embodiment thereof illustrated in the accompanying drawings of which:

FIGURE 2 is to an enlarged scale a sectional view taken along the line A—A of FIGURE 1 with the housing removed.

Figure 1:
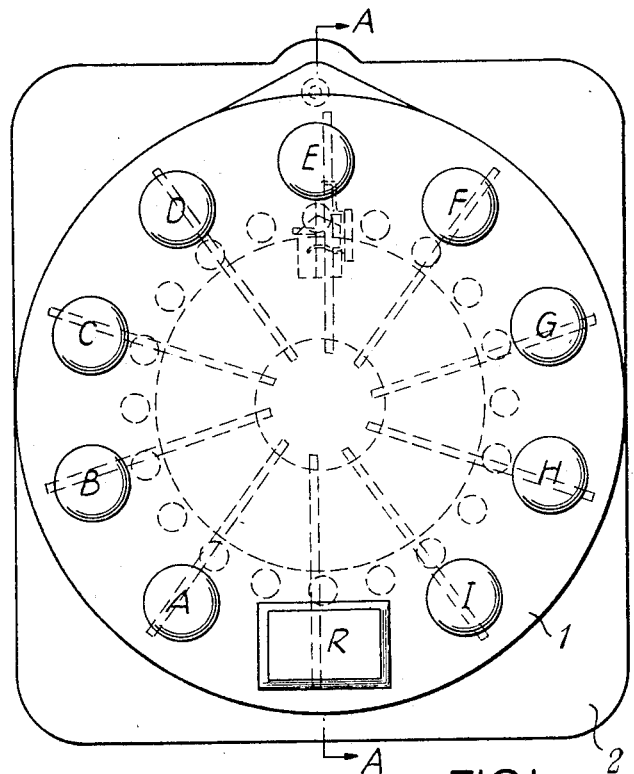
FIGURE 1 is a plan view of a mechanical selector mechanism.

The selector mechanism shown in the drawings is intended for use in a teaching machine wherein there exists the possibility of choice between eight answers by operating a selected one of eight push buttons marked A to H in accordance with the reference letter associated with the selected answer, the facility of returning to the question currently being answered by the operation of a push button R, and the feature that at a specific point in a series of questions if the pupil selects a certain wrong answer he is obliged to return to the beginning of the series by pressing a button I, the other buttons being rendered inoperable or ineffective under these latter conditions.

Any one of the buttons A to H may correspond to the correct answer and must then cause the film transport mechanism to move the film from the frame exhibiting the current question to the frame exhibiting the next question in the series passing over the intervening frames which exhibit comments on wrong answers and/or branch expansions of the text on which the current question was based. The other ones of the buttons A to H must cause the film transport mechanism to move from the frame exhibiting the current question to the frame exhibiting a comment and/or branch appropriate to the answer selected while the mechanism retains an indication of where the current question frame is in order that the transport mechanism may be reversed to bring such frame back into the gate in response to depression of button R which the pupil must depress to make a further answer selection. The various push buttons extend through apertures in a circular plate 1 mounted on the front of a housing 2 inside which is arranged the mechanism shown in FIGURE 2.

Figure 3:
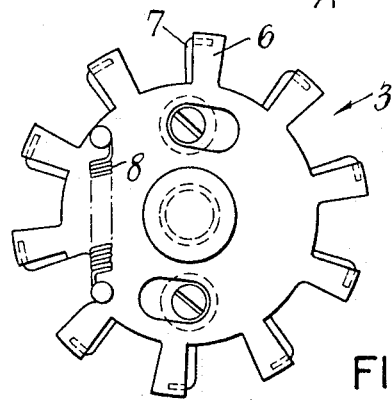
FIGURE 3 is a detailed view of part of FIGURE 2 looking in the direction of the arrow B.

In FIGURE 2 the selector mechanism is shown with push button E depressed and held depressed by a locking mechanism 3 which is shown in further detail in FIGURE 3. Mechanism 3 comprises two relatively rotatable discs 4 and 5 each having a series of teeth 6 and 7 respectively on its edge, the discs being constrained by a spring 8 to occupy relative positions in which the teeth of one series project into and reduce the effective width of the spaces between teeth of the other series. The rod such as 9, of each push button is linked to a cam plate 10 which extends through the spacing between adjacent teeth in the locking mechanism 3 and has a cam surface 10A on it by means of which, when a push button rod is displaced by depression of the button, the two discs are caused to rotate relative to one another to bring their teeth into alignment and thus release any button previously latched thereby and then spring back into their original positions behind a shoulder 10B on the cam plate to lock the plate and rod in the depressed position of the button.

In arriving at the position shown in FIGURE 2 the rod 9 of push button E has, by means of a finger 11, engaged and displaced to the left a disc 12 fixedly mounted on one end of a shaft 13 which at its other end carries a cam 14. Before such movement of disc 12 and shaft 13 a shoulder 15 on cam 14 was engaged under the nose end of a cam lever 16 so that as shaft 13 began to move lever 16 was pulled along with it. Lever 16 is pivotally connected at 17 to an arm 18 which is pivotally mounted at 19 on a bracket 20 secured to an end plate 21 of the mechanism. Midway between pivots 17 and 19 arm 18 engages a sleeve 22 slidably mounted on shaft 13 and carrying a plate 23 the outer periphery of which engages behind heads on pins 24 corresponding to the positions of the push buttons. Plate 23 has a cutout 25 where it would otherwise engage behind the head of the lowermost pin 24 which corresponds to the R button position. Thus as shaft 13 moves to the left plate 23 withdraws any pin 24 which may previously have been set (except for the lowermost pin) and the lower end of arm 18 sets the lowermost pin to the position shown. The pins thus set and reset are held in their various positions by springs 26 engaging in one or the other of two waists 27 and 28 formed in such pins. In FIGURE 2 the pin 24 corresponding to button E is shown in the reset or cleared position to which it has been moved by plate 23 and the pin 24 corresponding to the R button is shown in the set position to which it was moved by arm 18.

Towards the end of this movement of shaft 13 a cam surface 29 on cam lever 16 engages end plate 21 and causes lever 16 to pivot upwardly about pivot 17 to disengage its nose end from shoulder 15 of cam 14 and a spring 30 which has been compressed by sleeve 22 moving towards plate 21 returns sleeve 22, plate 23 and cam lever 16 to the positions shown in FIGURE 2. A further spring 31 ensures that cam lever 16 pivots downwardly as cam surface 29 is withdrawn from engagement with end plate 21.

Continuing its movement beyond the point of release of cam lever 16, shaft 13 causes cam 14 to engage and actuate a microswitch 32 controlling the energisation of the drive and take-up motors of the film transport mechanism (not shown).

The pins 24 are mounted in a drum 33 rotatably mounted on shaft 13 and arranged to the driven in rotation by gearing 34, 35 from the drive motor of the transport mechanism so that as soon as microswitch 32 is operated drum 33 begins to rotate. With the E button depressed as shown this rotation of drum 33 continues until the set pin 24 which was originally lowermost has travelled round until it reaches the position of the E button. As the pin approaches this positon it engages a cam surface 36 on the innermost end of the cam plate 10 of button E causing plate 10 to pivot about its centre and raise its other end out of latching engagement with the teeth 6 and 7 of the locking mechanism 3 thus releasing button E. A spring 37 which has been compressed by the movement of disc 12 ensures return movement of button E to its released position and also restores shaft 13 and cam 14 to their initial positions, this movement of cam 14 releasing microswitch 32 thus removing energisation from the motors of the transport mechanism and stopping movement of the film and the drum 33.

The arrival of the set pin 24 at the position of button E may be as the result of selection of the correct answer or as the result of selection of an incorrect answer. In the first case a new question on a frame of the film will be displayed in the viewing position of the teaching machine and a fresh selection of answer made by operating one of the buttons A to H. In this case the position marked by the set pin 24 is no longer of any significance and the operation of a further selection button automatically clears this indication out by resetting this pin with plate 23 as previously explained.

In the second case the button R has to be depressed to re-display in the viewing position the film frame carrying the original question but since the rod 9 of push button R is not equipped with a finger 11 the depression of button R does not cause clearing out of the set indication. The rod 9 of button R has on its innermost end a cam 38 which is arranged to operate a microswitch 39 when button R is depresed. Microswitch 39 controls energisation of the drive and take-up motors of the film transport mechanism for reverse movement of the film and of the drum 33. This reverse rotation of drum 33 continues until the set pin 24 engages a cam 40 in the inner end of the cam plate 10 of push button R to produce release of button R and microswitch 39 in the same manner as at position E. Thus no matter how many selections are made before the correct answer is selected the mechanism will control forward drive to the appropriate frame and automatically ensure return to the original question upon depression of the R button.

It is necessary to prevent a pupil making a second answer selection without first operating the R button to re-examine the original question and the answers thereto. This feature is provided by a solenoid 41 which is energised when a wrong answer is selected by a signal initiated by the film whenever a frame carrying a wrong answer stops at the viewing position. When the solenoid 41 is energised it inserts a locking pin 42 into a bore 43 in cam 14 to lock cam 14 and thus shaft 13 and disc 12 against movement. With disc 12 locked in position none of the selection buttons A to H can be operated.

As previously mentioned an additional feature is provided in the machine necessitating the depression of button I when the pupil selects a wrong answer at a certain stage in the series of questions presented. This feature is provided in part by the solenoid 41 which automatically locks all the buttons A to H, and in part by a further solenoid 44 which locks the R button against actuation under these circumstances and also reverses the functions of microswitches 32 and 39.

Initial depression of the button I is arranged to de-energise the solenoid 41. The rod 9 of button I is linked to the rod 9 of button A and it is not equipped with a cam plate 10 so that with continued depression of the button I, button A is locked in the depressed state and cam 14 operates microswitch 32 to cause reverse movement of the film transport mechanism and the drum 33. The set pin 24 corresponding to the R position is carried round by the drum in its reverse rotation passing the I position without effect and finally reaching the position of the actuated A button where it engages the cam 36 of this button releases the button and stops the motors. The extent of this reverse travel is arranged to take the film back to the starting question of the series or to some other desired earlier point in the series to enable the pupil to start again from such earlier point.

If it is desired that the pupil must progress question by question from such earlier point it is arranged that the release of button A and stopping of the motors also de-energises the additional solenoids so that the functions of microswitches 32 and 39 are restored to normal.

It is is desired that after reviewing the earlier question the pupil may return in one step to the position in the series he had earlier reached it is arranged that solenoid 41 and the further solenoid remain energised but the locking of button R by the solenoid 44 is released. Depression of button R will then actuate microswitch 39 to cause forward drive of the drum from the position of button A round to the home position marked by button R.

We claim:

1. In a teaching machine employing text recorded on successive frames of a film and having film transport mechanism for moving the film forwardly and backwardly past a viewing position, a mechanical selector mechanism for selecting the frame to be viewed, the selector mechanism comprising first means co-operating with the transport mechanism for initiating, when operated, forward movement of the film, second means co-operating with the transport mechanism for initiating, when operated, backward movement of the film, a movable member connected to the transport mechanism for movement in correspondence with the film, a plurality of manually actuatable selector members for selecting a frame subsequent to the initial one to be moved to the viewing position, a manually actuatable return member for selecting the initial frame for return to the viewing position, locking devices associated one with each of the selector members and the return member for locking the associated member, when actuated, in its actuated condition, a part carried by each selector member for operating the first initiating means when the associated member is actuated, a part carried by the return member for operating the second initiating means when the return member is actuated, and an element on said movable member for engaging, upon movement of the movable member, any locking device maintaining its associated member in its actuated condition for releasing the latter for return to its non-actuated condition whereby the operated initiating means reverts to its unoperated condition to stop movement of the film.

2. In a teaching machine employing text recorded on successive frames of a film and having film transport mechanism for moving the film forwardly and backwardly past a viewing position, a mechanical selector mechanism for selecting the frame to be viewed, the selector mechanism comprising first means co-operating with the transport mechanism for initiating, when operated, forward movement of the film, second means co-operating with the transport mechanism for initiating, when operated, backward movement of the film, a movable member connected to the transport mechanism for movement in correspondence with the film, a plurality of manually actuatable selector members for selecting a frame subsequent to the initial one to be moved to the viewing position, a manually actuatable return member for selecting the initial frame for return to the viewing position, locking devices associated one with each of the selector members and the return member for locking the associated member, when actuated, in its actuated condition, a part carried by each selector member for operating the first initiating means when the associated member is actuated, a part carried by the return member for operating the second initiating means when the return member is actuated, and a plurality of elements on said movable member in number equal to the number of selector and return members, each element being movably mounted on said movable member for movement from a set position to a reset position and vice versa, said first means including means for setting, upon operation of said first means, the one of said elements most adjacent the locking device associated with the return member and for ensuring, upon operation of said first means, that all the other of said elements are reset, each element being disposed when set but not when reset, upon movement of the movable member, for engaging any locking device maintaining its associated member in its actuated condition for releasing the latter for return to its non-actuated condition whereby the operated initiating means reverts to its unoperated condition to stop movement of the film.

3. A mechanical selector mechanism according to claim 2, wherein said movable member is a drum connected to the transport mechanism for rotation in correspondence with movement of the film, said elements being disposed at angular intervals around the peripheral part of the drum.

4. A mechanism selector mechanism according to claim 2, and further comprising means for preventing actuation of selector members following actuation of one of them until after the return member has been operated.

5. A mechanical selector mechanism according to claim 2, and further comprising means for preventing actuation of the selector and return members and for causing the first means, when operated, to initiate backward instead of forward movement of the film, and a further manually actuatable member linked to one of the selector members, for overriding the preventing means and actuating said one selector member when said further member is actuated.

References Cited by the Examiner
UNITED STATES PATENTS

| | | | |
|---|---|---|---|
| 2,121,061 | 6/1938 | Townsend | 40—53 |
| 2,323,372 | 7/1943 | Bryce | 88—24 |
| 2,464,220 | 3/1949 | Duncan et al. | 88—24 |
| 2,659,779 | 11/1953 | Haley | 88—24 |
| 3,103,073 | 9/1963 | Nickl et al. | 35—9 |
| 3,120,708 | 2/1964 | Silber | 35—9 |
| 3,123,920 | 3/1964 | Crowder et al. | 35—9 |

EUGENE R. CAPOZIO, *Primary Examiner.*